Patented Oct. 22, 1929

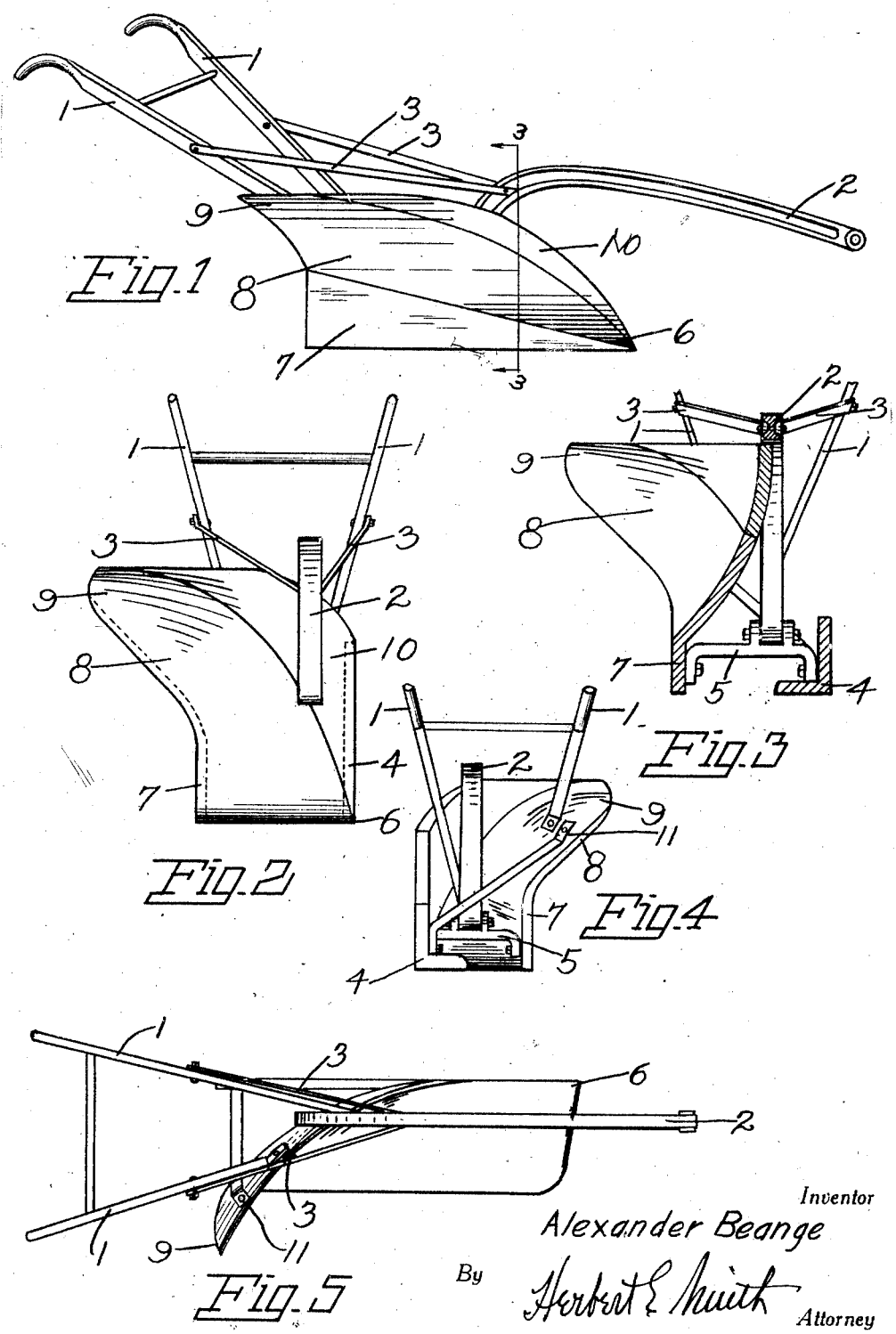

1,732,455

UNITED STATES PATENT OFFICE

ALEXANDER BEANGE, OF ANACONDA, MONTANA

PLOW

Application filed March 7, 1928. Serial No. 259,739.

My present invention relates to improvements in plows of the walking, shovel type, and particularly to the moldboard construction of such plows whereby the furrow is turned and then laid flat upon the soil in preparation of the seed bed. In carrying out my invention I save time and labor and secure uniformity in turning the soil and instead of forming a series of furrows or corrugations that will necessitate frequent use of the harrow, the field is left in a comparatively smooth condition requiring a minimum cultivation by the harrow. The moldboard has a shovel front or share passing horizontally beneath the soil, which is thereby lifted in the form of a ribbon, and, due to the spiral or twisted formation of the moldboard the plowed ribbon is turned over and deposited as a flat furrow at the side of the plow.

The invention consists in certain novel combinations and arrangements involving the moldboard as will hereinafter be more fully set forth and claimed.

In the accompanying drawings I have illustrated one complete example of the physical embodiment of my invention wherein the parts are combined and arranged according to the best mode I have so far devised for the practical application of the principles of my invention.

Figure 1 is a view in side elevation of a plow embodying my invention. Fig. 2 is a front view of the plow. Fig. 3 is a vertical sectional detail view at line 3—3 of Fig. 1 looking toward the rear. Fig. 4 is a rear elevation of the plow. Fig. 5 is a top plan view of the plow.

In carrying out my invention I utilize the customary handles 1, the draft beam 2, braces 3, and the landside 4. The usual frame members 5 are employed for bracing and connecting the various parts of the plow.

The moldboard is provided with a shovel share 6 which is disposed horizontally and provided with a bevelled cutting edge which extends diagonally from the landside as best seen in Fig. 5. The moldboard is fashioned with a wedge-shaped side-plate 7 which extends from a point at the share and is inclined upwardly to the rear as best seen in Fig. 1. This side-plate stands perpendicular to the soil and is parallel with the landside as seen in Fig. 3. The moldboard proper is indicated as 8 and it extends rearwardly from the flat share 6 upwardly, and is provided with a twist or spiral formation that terminates in the outwardly arranged wing 9. This wing 9 is located at the rear of the moldboard and overhangs the side-plate 7 as best seen in Fig. 3. The moldboard is also fashioned with a guard-plate 10 which rises upwardly and rearwardly from the share 6 and is designed to turn loose soil that might break from the edge of the main ribbon and guide it to the wing 9 of the moldboard.

The several parts are braced together and bolted as at 11 to form a rigid structure for the plow.

It will be apparent that as the plow advances it will cut a flat ribbon from the top of the soil, and this ribbon will be given a turn as it passes upwardly and rearwardly over the moldboard, until the wing 9 finally turns over the ribbon and it lies flat, and face downward, at the side of the plow. In this manner the field is cultivated with successive flat ribbons and these ribbons may then be levelled and the soil broken up by the passage thereover of a harrow in usual manner. The progress of the harrow of course is made easier by the fact that the plow produces a comparatively uniform and flat surface over which the harrow may pass in cultivating the soil and preparing the seed bed.

Having thus fully described my invention what I claim as new and desire to secure by Letters Patent is:

The combination in a walking plow of the shovel type having a horizontally disposed diagonally arranged share, a moldboard having a perpendicular side-plate having a rearwardly and upwardly inclined upper edge, said moldboard having a spiral twist therein terminating in an upper rear wing overhanging the side-plate, and a guard plate at the landside portion of the plow extending from the share and terminating with said wing.

In testimony whereof I affix my signature.

ALEXANDER BEANGE.